April 2, 1968  E. F. READ  3,376,573
CRAB ANGLE SENSING SYSTEM FOR ALL-WEATHER LANDING SYSTEM
Filed June 30, 1967  6 Sheets-Sheet 2

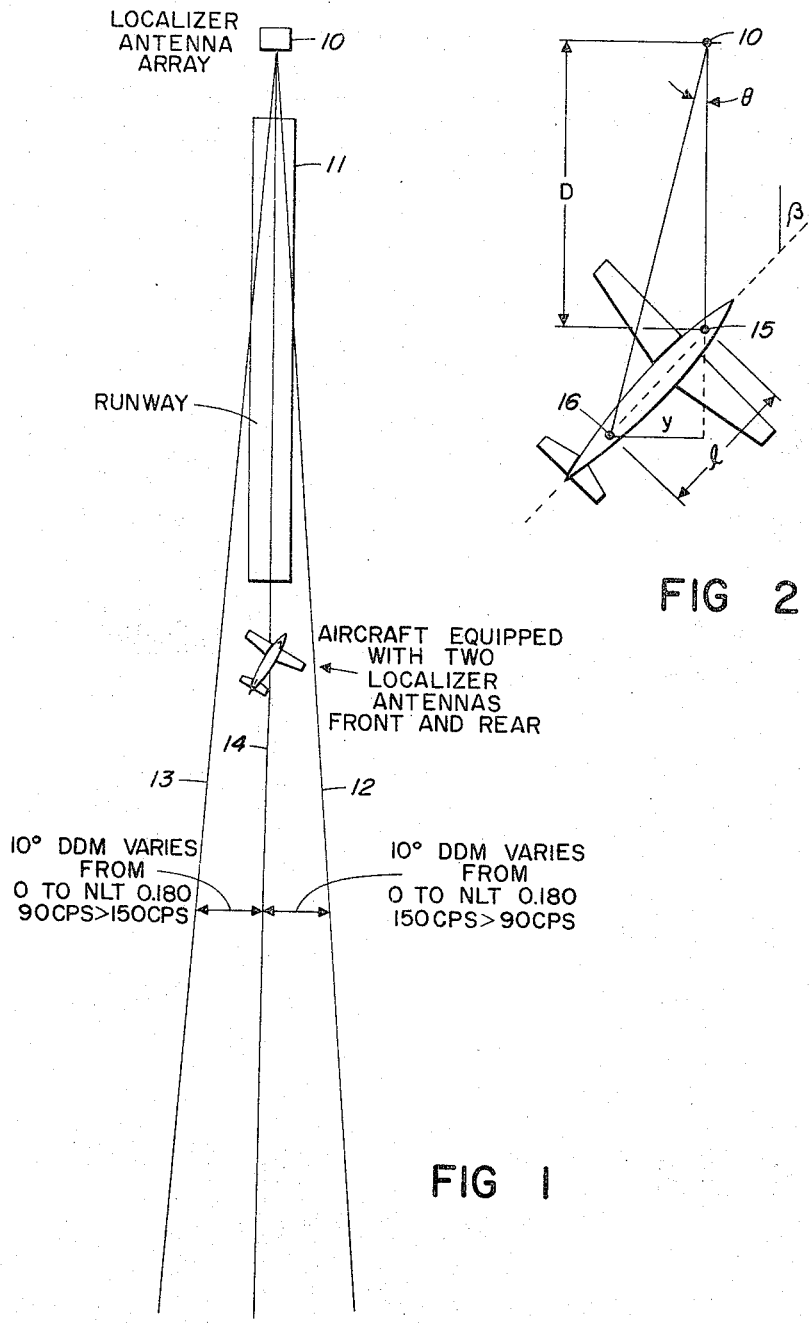

INVENTOR.
EMANUEL F. READ
BY
Moody & Anderson
AGENTS

April 2, 1968          E. F. READ          3,376,573

CRAB ANGLE SENSING SYSTEM FOR ALL-WEATHER LANDING SYSTEM

Filed June 30, 1967          6 Sheets-Sheet 4

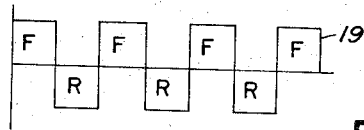

ANTENNA SWITCHING

FIG 5

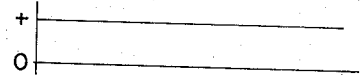

90 CPS ON COURSE    (A)

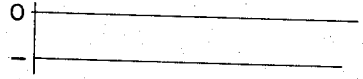

150 CPS ON COURSE    (B)

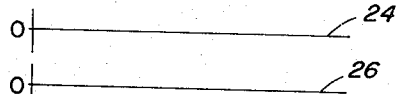

90/150 CPS    (C)

DIFFERENCE THROUGH AC COUPLING    (D)

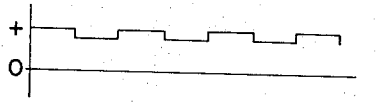

90 CPS RIGHT CRAB    (E)

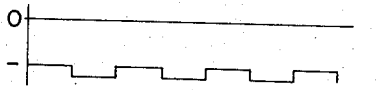

150 CPS RIGHT CRAB    (F)

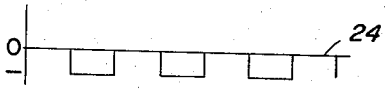

90/150 CPS DIFFERENCE    (G)

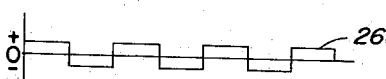

90/150 CPS DIFFERENCE THROUGH AC COUPLING    (H)

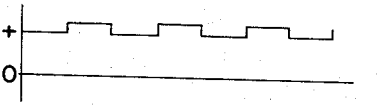

90 CPS LEFT CRAB    (I)

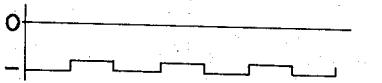

150 CPS LEFT CRAB    (J)

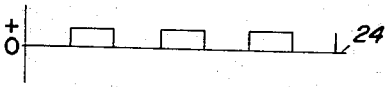

90/150 CPS DIFFERENCE    (K)

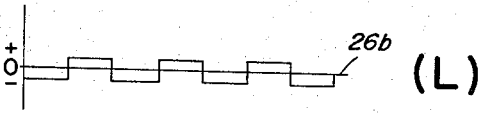

90/150 CPS DIFFERENCE THROUGH AC COUPLING    (L)

INVENTOR.
EMANUEL F. READ

BY

*Moody & Anderson*

AGENTS

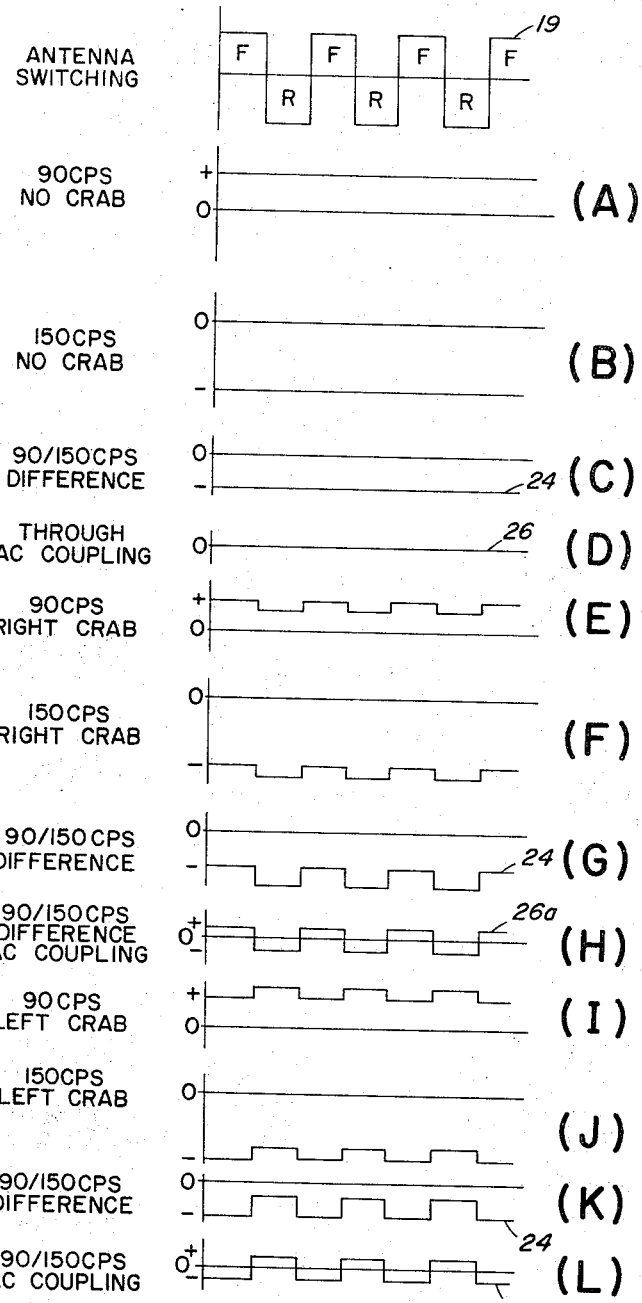

United States Patent Office 3,376,573
Patented Apr. 2, 1968

3,376,573
CRAB ANGLE SENSING SYSTEM FOR ALL-WEATHER LANDING SYSTEM
Emanuel F. Read, Cedar Rapids, Iowa, assignor to Collins Radio Company, Cedar Rapids, Iowa, a corporation of Iowa
Filed June 30, 1967, Ser. No. 650,273
7 Claims. (Cl. 343—107)

ABSTRACT OF THE DISCLOSURE

A detection system for determining the angle and direction of crab between the longitudinal axis of a vehicle and a reference course line established by a plane of equal field intensities between a pair of overlapping field patterns such as the VHF localizer beam. The system employs a pair of space-separated receiving antennas gated alternately into a conventional proportional in polarity and magnitude to the extent and direction of deviation from the localizer beam and is applied through AC coupling means to recover an AC signal proportional to the difference in depth of th tone modulations of signals received by the respective antennas. A detection means operating synchronously with the antenna gating sequence recovers a signal proportional to vehicle crab angle with respect to the radio defined course line.

---

This invention relates generally to aircraft landing systems and more particularly to a detection system for determining the crab angle of an aircraft with respect to a course line defined by a VHF localizer navigation aid.

As aircraft and their associated navigation systems approach capabilities of all weather operation the need to eliminate, or to be aware of, the established crab angle experienced during runway approach is very important. The crab angle or jaw, with respect to the localizer course center line, must be eliminated prior to touchdown. Under conditions of good visibility, the pilot may effect a decrab maneuver just prior to touchdown by visual observation of jaw attitude with respect to the runway center line. Under conditions of reduced visibility, however, a system is needed which will at least detect the aircraft crab angle and pass the information to the pilot, so that he might manually effect a decrab maneuver by observing the cockpit indicator or, alternatively, the detection system might feed into an autopilot control system where, in conjunction with altitude information, an automatic decrab maneuver could be initiated just prior to touchdown.

From the standpoint of navigation systems with all-weather operation capabilities, a crab angle detection system should permit landing without visual reference outside the cockpit and without reliance on compass systems or manual set-ups. The present invention provides a system for developing a signal with magnitude and sense respectively proportional to crab angle magnitude and direction—that is, direction either left or right from the established aircraft course line.

The present invention is featured in a synchronous detection system employing the directional properties of a UHF localizer ground transmitter beam and a conventional localizer receiver, together with a crab angle instrumentation unit. A pair of space-separated localizer receiver antennas are employed with the antennas alternatively switched to the input of the localizer receiver. The output from the standard localizer receiver is conventionally a DC signal with magnitude and polarity respectively proportional to the extent and direction of the aircraft's deviation from the selected localizer course line. Processing of the localizer receiver output with alternately switched antenna inputs develops a DC signal with magnitude and polarity respectively proportional to the aircraft crab angle with respect to the selected course line and the direction of the crab angle. The crab angle indicative DC signal may be monitored on a left-right indicator and/or may be applied as input to autopilot steering control circuits as an indication of the direction and extent of the crab angle such that an automatic decrab maneuver might be effected.

An object of the present invention is accordingly the provision of an electronic crab angle sensing system employing a standard localizer receiver in conjunction with two space-separated receiver antennas the outputs of which are alternately gated as input to the localizer receiver. The output of the localizer receiver is further processed in accordance with the present invention to develop a DC signal indicative of the aircraft crab angle, both as to magnitude and sense.

A further object of the persent invention is the provision of a crab angle sensing device employing a localizer receiver in conjunction with two antennas together with means to derive the modulation rate of change across the localizer beam from which a signal proportional to crab angle may be derived.

The present invention is featured in the provision of fore and aft receiving antennas being sequentially gated as input to a localizer receiver, with means for AC coupling the receiver output to a differential detector. The differential detector is operated synchronously with a gating means effecting the antenna switching so as to develop a DC signal the amplitude of which is proportional to the aircraft crab angle and the polarity of which is indicative of the direction of the crab angle with respect to the localizer defined course line.

These and other features of the present invention will become apparent upon reading the following description in conjunction with the accompanying drawings in which;

FIGURE 1 is a diagrammatic representation of a localizer radio beam in conventional relationship with a landing strip;

FIGURE 2 is a diagrammatic representation of the crab angle geometry considered in the implementation of the invention;

Figure 3:
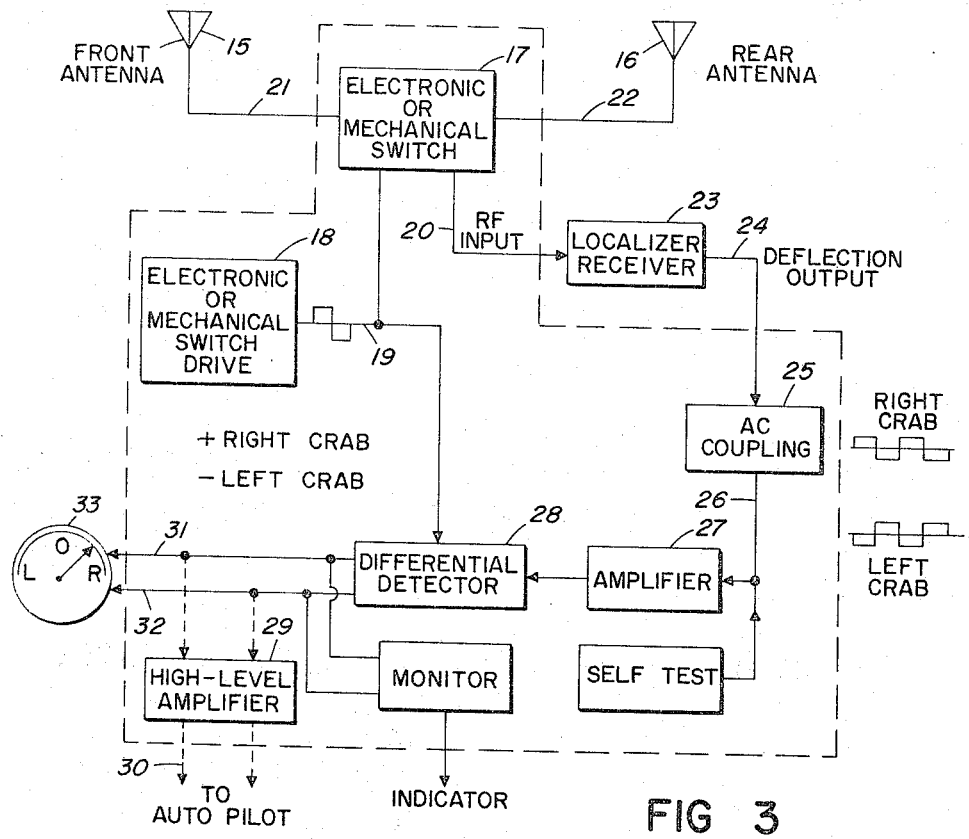
FIGURE 3 is a functional diagram of the crab angle detection system in accordance with the present invention.
Figure 8:
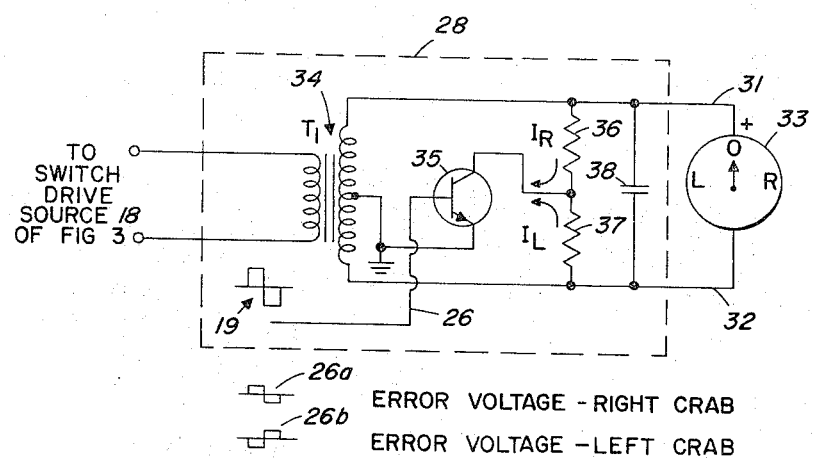
Figure 7:
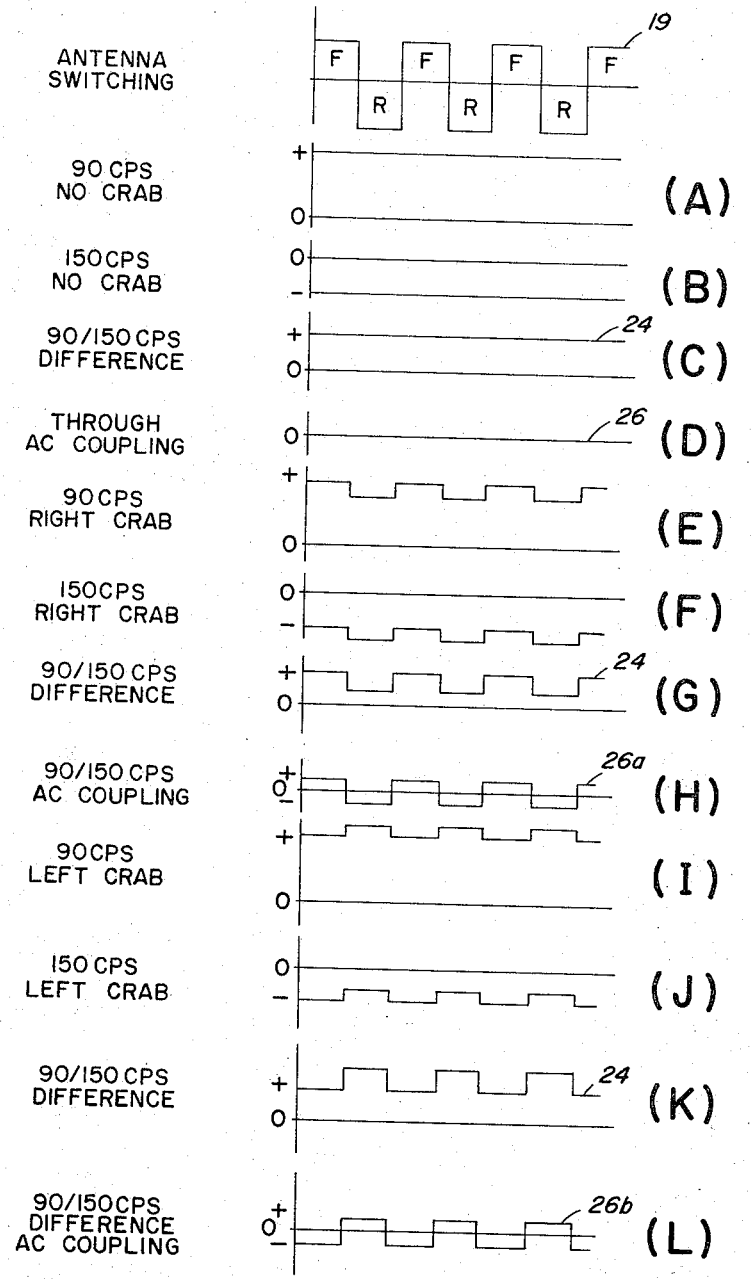

FIGURES 5, 6, and 7 illustrate operational waveforms of the system of FIGURE 3 for both right and left crab angle situations under conditions of on course, to the right of course, and to the left of course, respectively; and FIGURE 8 is a schematic diagram of a type of differential detector which may be employed in the system of FIGURE 3.

The system of the present invention is based on the field intensity considerations of the standard localizer radio beam field pattern. FIGURE 1 illustrates functionally a localizer transmitter antenna 10 placed at the end of a runway 11. The localizer field pattern consists of two signals transmitted by two directional antennas. The width of the lobes of the antenna patterns is small and each is directed along one side of the localizer course, the runway center line. A first VHF signal is amplitude modulated at 150 Hz. and is directed to the right of the course and a second VHF signal is amplitude modulated at 90 Hz. and directed to the left of the course. The transmitted lobes are arranged so that their field intensities are equal along a line bisecting the center of the runway. The standard localizer receiver demodulates the composite signal received from the two lobes. When the aircraft is located on the course, the magnitude of the 90 Hz. modulation equals that of the 150 Hz. modulation due to equal field intensities of the received signals. The conventional localizer receiver detects the two signals and compare them differentially. When an on course condition exists, the deflection current from the localizer receiver is zero. When the aircraft is approaching to the right of the runway, the amplitude of the 150 Hz. signal exceeds that of the 90 Hz. and a deflection current of a first polarity is developed to provide an indication of the extent that the aircraft is off the localizer course in this direction. Conversely, should the aircraft be approaching to the left of the localizer course, the 90 Hz. signal exceeds the 150 Hz. signal and the localizer receiver develops a DC output of the opposite polarity indication of the extent that the aircraft is off course to the left.

The localizer receiver and the localizer ground station transmission pattern are well known expedients in the aircraft landing aid art. The deflection current generated by a localizer receiver is, by definition, proportional to the difference in field intensities of the 90 and 150 Hz. amplitude modulated lobes. By definition, these field intensities are established as being equal along a line coincident with the intersection of the two lobes, which line is in turn coincident with the landing strip center line. As the aircraft deviates to one side or to the other of the course line the difference in field intensities of the modulation components varies. With reference to FIGURE 1, when the aircraft is to the right of the center line 14 in the area generally designated by reference numeral 12, the 150 Hz. modulation component exceeds that of the 90 Hz. component. When the aircraft is to the left of the center line 14 in the area generally designated by reference numeral 13, the 90 Hz. modulation component exceeds the amplitude of the 150 Hz. component. The difference in depth of modulation of a typical localizer beam varies in a linear fashion from zero on the center line 14 to not less than 0.180 at plus or minus 10° from the center line.

As will be described, the present invention generally derives the modulation rate of change across the localizer beam to develop a signal proportional to the crab angle.

Reference is made to the crab angle geometry of FIGURE 2 wherein an aircraft is illustrated in crab angle position with respect to a localizer ground transmitter 10. The crab angle depicted in FIGURE 2 is designated as $\beta$ and is the angle between the longitudinal axis of the aircraft and a line between a first antenna 15 mounted on the aircraft and the localizer transmitter 10. The distance between the aircraft and the transmitter 10 is depicted as D. A second antenna is located along the longitudinal axis of the aircraft at 16. The fore and aft antennas 15 and 16 are separated by a distance $l$. The antennas 15 and 16 define an angle $\theta$ with respect to the ground transmitter 10. From the antenna position geometry of FIGURE 2, $$\sin \beta = \frac{y}{l}$$

For small angles, $\sin \beta$ equals the angle $\beta$ in radians,

Thus:

$$\frac{\beta}{57.3} = \frac{y}{l}$$

and $$y = l \frac{\beta}{57.3} \quad (1)$$

If the distance to the station D is considerable as compared to the antenna separation, then $$D \gg \sqrt{y^2}$$

$$\tan \theta \cong \frac{y}{D} \cong \frac{\beta l}{D(57.3)} \quad (2)$$

For small angles $\theta$ $$\tan \theta = \theta \text{ (radians)}$$

and:

$$\theta \text{ (radians)} \cong \frac{\beta l}{D(57.3)} \quad (3)$$

and $$\theta \text{ (degrees)} = \frac{\beta l}{D} \quad (4)$$

From expression (4), it is seen that $\theta$ is directly proportional to crab angle $\beta$ and inversely proportional to the distance D from the localizer transmitter. If the localizer deflection is defined as $45 \mu a./\text{degree}$, then, the deflection $\Delta_D$ may be expressed as:

$$\Delta_D = 45 \frac{\beta l}{D} \quad (5)$$

and deflection per degree of crab angle may be expressed as:

$$\frac{\Delta_D}{\beta} = \frac{45 l}{D} \frac{\mu \text{amp}}{\text{degrees}} \quad (6)$$

Expression (5) above thus indicates that, within valid assumption for the small angles involved in the geometry, the deflection current from the localizer receiver is proportional to crab angle $\beta$ and inversely proportional to the distance D from the localizer transmitter when the distance between the antenna is assigned a fixed value.

Figure 4:
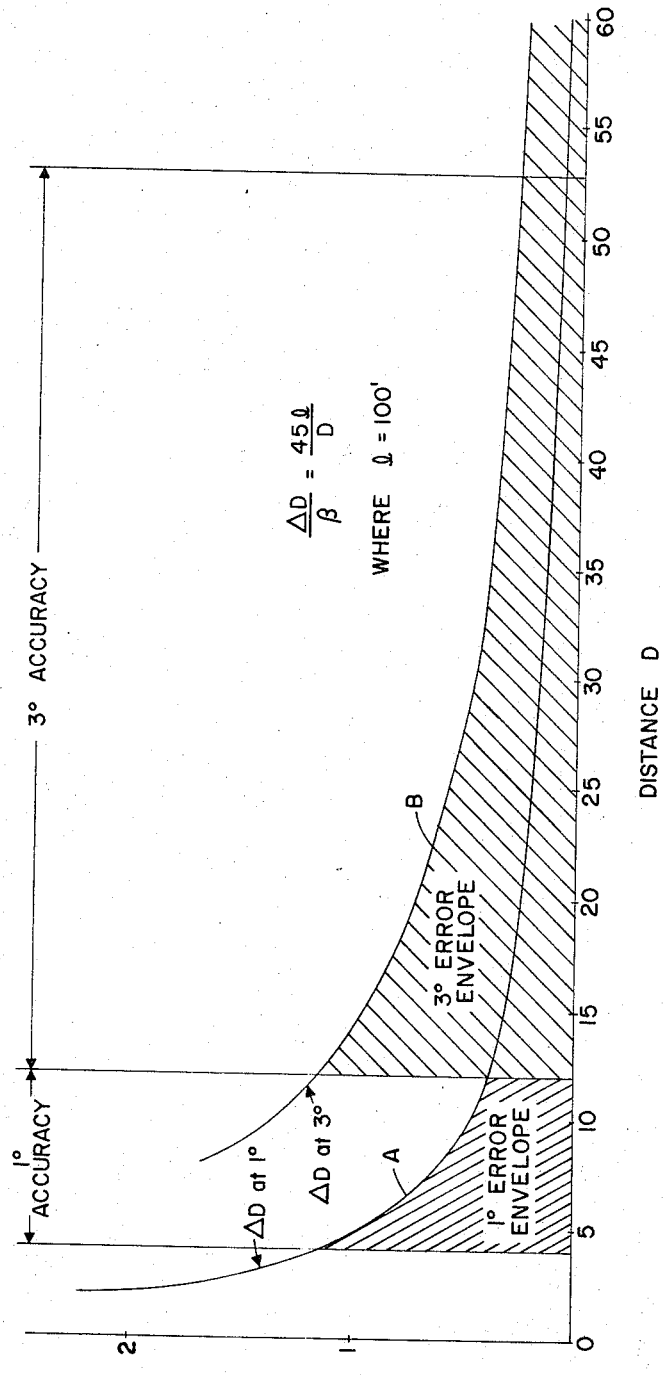
FIGURE 4 is a plot of the crab angle deflection current vs. distance to a localizer transmitter.

FIGURE 4 is a graphical plot of the DC deflection current per degrees as distance from the localizer transmitter increases. Plot A of FIGURE 4 is a plot of the above expression (6). Plot B of FIGURE 4 indicates deflection current expected at 3° crab angle and is obtained by multiplying Equation 6 by a factor of 3. This deflection current is representative of that to be expected from conventional localizer receivers operating from dual antennas. This deflection current is not useful for crab angle sensing without modification since it does not indicate right vs. left crab angles. However, this current is proportional to crab angle $\beta$ and inversely proportional to distance, and useful information may be derived from the deflection current by employing the techniques of FIGURE 3.

As shown in FIGURE 3, two antennas 15 and 16 are employed. The antennas 15 and 16 are disposed along the longitudinal axis of the aircraft with a fixed separation, such as, for example, 100 feet. The outputs from antennas 15 and 16 are connected to an electronic or mechanical switch means 17 by means of connectors 21 and 22, respectively. Switching means 17 operates under the control of a switch drive source 18 which supplies a switching control 19 to the switch 17. For example, the source 18 might be electronic in nature and develop a switching square wave of period T to an electronic switch 17, such that the outputs 21 and 22 from the antennas 15 and 16 are alternately connected through line 20 as input to the localizer receiver 23. The switching rate might be in the region of nine cycles per second—that is, a low frequency rate preferably not at a submultiple of 90 or 150 Hz.

The standard localizer receiver 23 conventionally functions to demodulate the composite 90 and 150 Hz. amplitude modulated carrier waves supplied alternately by the antennas 15 and 16 and provide a DC output proportional to the difference between the magnitudes of the two tones.

The operational waveforms of FIGURE 5 represent an on-course situation under conditions of no crab, crab right, and crab left, respectively. FIGURE 5 includes a first functional representation of the antenna switching rate to depict the successive alternate time applications of received energy from antennas 15 and 16 to the localizer receiver. The successive receptions are identified alternately as F and R to identify reception from the front antenna 15 and the rear antenna 16, respectively.

Waveforms A, B, and C of FIGURE 5 depict the development of deflection output current in the localizer receiver for a condition of zero crab under the on-course situation. Note that waveforms A and B depict equal and opposite amplitude DC currents as would be developed within the localizer receiver 23 which, when combined differentially within the receiver, result in a zero deflection output 24 (waveform C).

The output 24 from localizer receiver is applied through the AC coupling network 25. Since, in this instance, the output from the receiver is zero, the output 26 from the AC coupling network is likewise zero (waveform D). Under conditions of right crab (aircraft tail swings right) note that the amplitudes of the successive receptions from the respective antennas 15 and 16 vary, since the forward antenna receives a higher amplitude 90 Hz. component than the rear antenna. This is evident from the geometry of FIGURE 1. Thus, waveform E of FIGURE 5 depicts levels of the 90 Hz. demodulated signal for the successive reception periods from the two antennas as a step-like wave, with the amplitude of the DC signal during reception from the forward antenna exceeding that during period of reception from the rear antenna. Waveform F illustrates the magnitude of the 150 Hz. component as developed in the localizer receiver and is seen to reflect a greater amplitude of the 150 Hz. component during periods of reception from the rear antenna than during the period of reception from the forward antenna under the condition of right crab. The localizer receiver 23 combines the signal proportional to the 90 and 150 Hz. modulation components to develop a deflection output 24 as illustrated in waveform G. It is noted that the localizer receiver output 24 is a series of negative-going square waves corresponding to the difference between the amplitudes of waveforms E and F. When the output 24 (waveform G) is applied through the AC coupling network 25, a symmetrical square wave is developed the amplitude of which is proportional to the amplitude of the localizer receiver output 24 (waveform G) and the phase of which has a specific relationship with the antenna switching waveform 19.

Waveforms I, J, K and L illustrate the condition of left crab angle (aircraft tail swings left). Here it is noted that the amplitude of the 90 Hz. modulation component during the periods of reception from the rear antenna exceeds the amplitude of the 90 Hz. component during the reception periods from the forward antenna (waveform I), while the amplitude of the 150 Hz. modulation component during reception from the rear antenna is less than the amplitude of this component during reception from the forward antenna. The resulting localizer receiver deflection output 24 (waveform K) is the difference between the waveforms I and J and is a series of positive pulses. After passing through the AC coupling network 25 the receiver output 24 is converted to an AC waveform (waveform L).

Reference to waveforms H and L of FIGURE 5 illustrate that the output 26 from the AC coupling network 25 is comprised of a square wave the amplitude of which, from previous discussion, is proportional to crab angle. Note also that waveforms H and L carry a sensing in the form of a phase relationship with respect to the antenna switching waveform 19. Waveform 26a and 26b are opposite phase. The output from the AC coupling network 25 is thus of one phase or the other dependent upon whether a right or left crab angle exists. The signal 26 is thus seen to provide sufficient information concerning crab angle.

The right or left crab signals 26a or 26b of FIGURE 5 may then be applied through amplifier 27 to a differential detector 28. The detector outputs 31–32 may then be applied directly to a zero center indicator 33 as depicted in FIGURE 3. The detector output 31–32 may also be applied through high level amplifier 29 to provide an output 30 to an autopilot computer which could utilize the information to effect automatic decrabing.

A type of differential detector 28 which may be employed is depicted in FIGURE 8. The differential detector must provide an output deflection current proportional to the crab angle or jaw and must indicate the direction of jaw. In other conditions, the detector 28 must supply an output proportional to the level of waveforms H or L of FIGURE 5 and also indicate the direction. With reference to FIGURE 8, the detector might comprise a transformer 24 with center tapped secondary windings phased as indicated. The antenna switch drive source waveform 19 may be applied to the primary of the transformer 24. A voltage dividing network comprising resistors 36 and 37 is connected across the secondary winding of transformer 34. The center tap of the secondary winding is connected to the emitter of a transistor 35. The collector of transistor 35 is connected to the junction of resistors 36 and 37. The output 26 of the AC coupling network of FIGURE 3 is applied to the base of transistor 35. A capacitor 38 shunts the series interconnection of resistors 36 and 37 and the indicating meter 33 likewise shunts the resistive network. In operation, assuming a right crab angle error voltage as depicted in waveform H of FIGURE 5 being applied to the base of transistor 35, the transistor conducts on the positive excursions of the input waveform in the direction indicated by $I_R$ in FIGURE 8. The upper end of resistor 36 is then positive, which produces a deflection proportional to the level of the input waveform 26 on the meter 33. If a left crab error voltage 26b is applied to the base of transistor 35, current flow as indicated by $I_L$ in FIGURE 8 flows, producing a positive potential at the lower end of resistor 37. Circulating current will then produce an opposite deflection in the meter 33. Capacitor 38 provides filtering or averaging of the output pulses and its value would be determined by the switching rate and degree of meter damping desired. For purposes of simplicity, the biasing for the transistor is not shown.

The operation of the embodiment of FIGURE 3 has been discussed with respect to conditions of no crab, left crab and right crab when the aircraft is on course. FIGURES 6 and 7 illustrate further operational waveforms under conditions of the aircraft being to the right of course line and to the left of the course line, respectively. Inspection of the waveforms of FIGURE 6 and FIGURE 7 will bear out that the output from the localizer receiver 23, after being applied through the AC coupling network 25, is the same waveform for the same crab angle regardless of whether the aircraft is on the localizer course, or to the left or right of the localizer course, since the magnitude of the signal from the AC coupling network is based on the difference in depth of modulation of the 90 and 150 Hz. modulations as received on the two antennas.

With reference to FIGURE 6, operational waveforms are depicted under conditions where the aircraft is to the right of the course line; that is, it is in an area where the magnitude of the 150 Hz. modulation component as received exceeds that of the 90 Hz. component (see FIGURE 1). Waveforms A and B depict the relative magnitude of these modulation components as they would be detected in the localizer receiver 23. Waveform C illustrates the output 24 from the localizer receiver as being a negative DC voltage the amplitude of which is proportional to the difference between the 150 and 90 Hz. modulation components. Waveform D of FIGURE 6 illustrates that the DC output of waveform C does not pass through the AC coupling network 25 and thus the output 26 from AC coupling network is again zero under no crab conditions.

Waveforms E, F, G and H of FIGURE 6 represent the right crab condition. Note that these waveforms are similar to the corresponding waveforms of the on-course condition of FIGURE 5 with the exception that the relative magnitudes of the 90 and 150 Hz. components have changes. Since the aircraft is in the area where the 150 Hz. component is greater than the 90 Hz. component, waveforms E and F of FIGURE 6 reflect a correspondingly greater magnitude of the 150 Hz. component as it is received from both the forward and rear antennas; however, the difference in magnitude for a given crab angle with respect to localizer course remains the same. Thus, waveform H of FIGURE 6 which depicts the localizer receiver output after being passed through the AC coupling network 25, becomes a waveform identical to waveform H for the on-course condition illustrated in FIGURE 5. Similarly, a left crab condition, although establishing relatively different magnitudes of 150 Hz. and 90 Hz. modulation components still exhibit the same difference in magnitudes between the components during the alternate reception periods from the two antennas. Thus, waveform L of FIGURE 6 is identical to waveform L of FIGURE 5, assuming that the crab angle with respect to the localizer course is the same angle.

FIGURE 7 illustrates operational waveform under condition of the aircraft being to the left of the course line. Under this condition, with reference to FIGURE 1, the 90 Hz. modulation component will be greater than the 150 Hz. components as it is received on either of the two antennas. As with the condition of the aircraft being to the right of the course, the relative magnitudes of the two modulation components differ from either the on-course condition of FIGURE 5 or the right on-course condition of FIGURE 6. However, the difference between the magnitudes as received on the two antennas remains the same for a given crab angle and the output 24 of the localizer receiver 23, after passing through the AC coupling network 25, develops the same signal.

It has been shown that the output of the localizer receiver after passing through AC coupling network 25 is a square wave signal the amplitude of which is proportional to crab angle and the phase of which is dependent upon the direction of the crab. In each flight situation, the output from the localizer receiver, after passing through the AC coupling network, consists of a distinctive square wave the magnitude of which is proportional to crab angle and the phase of which is indicative of the direction or sense of the crab angle.

The present invention thus provides a system giving crab angle information by employing a standard localizer receiver in conjunction with a pair of space separated receiving antennas which are alternately switched to the receiver input. The geometry of the flight situation and that of the localizer beam defines the deflection output from the localizer receiver as being proportional to crab angle and inversely proportional to the distance from the localizer transmitter. The system thus inherently exhibits a sensitivity which increases as the aircraft approaches touchdown thus providing maximum control where maximum control is desired. This same feature also reduces the crab angle correction rate at long distances from the transmitter to prevent the uncomfortable effect of continual high rate corrections.

Although the present invention has been described with respect to a particular embodiment thereof it is not to be so limited as changes may be made therein which fall within the scope of the invention as defined by the appended claims.

I claim:

1. A system for determining the angle of crab between the longitudinal axis of a vehicle and a reference course line as established by a plane of equal field intensities between a pair of overlapping field patterns respectively amplitude modulated at first and second tone frequencies, said system comprising a pair of receiving antennas mounted in space-separated relationship along the longitudinal axis of said vehicle, signal receiving means, switching means connected to said pair of receiving antennas and to said receiving means, switch control means connected to said switching means to effect alternate connection of said pair of receiving antennas to said receiving means at a predetermined switching rate, said receiving means including detection means for developing a DC output voltage proportional to the differential comparison of the magnitudes of said demodulated tones and alternating current coupling means receiving the output from said receiving means and converting the output of said receiving means to a symmetrical alternating current signal the amplitude of which is proportional to said vehicle crab angle and the phase of which, as compared to said antenna switch control means, is indicative of the sense of said crab angle with respect to said reference course line.

2. A system as defined in claim 1 further comprising differential detecting means receiving the output from said alternating current coupling means and developing therefrom a direct current output the magnitude of which is proportional to said crab angle and the polarity of which is indicative of the sense of said crab angle with respect to said reference course line.

3. A system as defined in claim 2 wherein said antenna switching means comprises an electronic switch, said switch control means comprising a symmetrical square wave alternating current source of period substantially less than that defined by said first and second tone frequencies, said differential detector receiving said symmetrical square wave, the polarity of said direct current output from said differential detector being determined by the relative phase between said symmetrical square wave and that of the output from said alternating current coupling means.

4. A system as defined in claim 3 wherein the period of said symmetrical square wave is defined by a predetermined frequency other than a submultiple of either of said first and second tones.

5. A system as defined in claim 4 including means to amplify the output of said alternating current coupling means prior to application to said differential detector.

6. A system as defined in claim 5 wherein said differential detector comprises a transformer having a primary winding to which said antenna switch control signal is applied and a secondary winding the ends of which are shunted by said first and second series interconnected like resistors, a transistor with an emitter electrode connected to the center of said transformer secondary winding and a collector electrode connected to the junction between said first and second resistors, said output from said alternating current coupling means being applied to the base of said transistor to render said transistor conductive during alternate half cycles of the signal applied to the transistor base which half cycles have a predetermined polarity, whereby a direct current voltage is developed across said first and second resistors, said direct current voltage having a polarity peculiar to the sense of the crab angle of said vehicle and a magnitude proportional to that of said crab angle.

7. A system as defined in claim 6 wherein said vehicle comprises an aircraft, said first and second antennas being mounted respectively at forward and rearward locations along the longitudinal axis of said aircraft, said reference course line being defined by a localizer beam, said receiving means comprising a localizer receiver, and indicating means comprising a meter connected to the output of said differential detector, said meter exhibiting zero deflection in response to zero crab angle and left and right deflections of a magnitude proportional to said crab angle and the respective sense thereof.

References Cited

UNITED STATES PATENTS

| | | | |
|---|---|---|---|
| 1,589,398 | 6/1926 | Kelley | 343—107 |
| 2,158,584 | 5/1939 | Koster | 343—107 |
| 2,519,521 | 8/1950 | Weighton | 343—108 |
| 2,646,564 | 7/1953 | Perilhou | 343—112 |
| 2,760,190 | 8/1956 | Henrici | 343—112 |

FOREIGN PATENTS 871,873   1/1942   France.

RODNEY D. BENNETT, *Primary Examiner.*

H. C. WAMSLEY, *Assistant Examiner.*